United States Patent
Nishii (10) Patent No.: US 12,423,423 B2
(45) Date of Patent: Sep. 23, 2025

(54) IMAGE FORMING APPARATUS AND IMAGE FORMING METHOD

(71) Applicant: SHARP KABUSHIKI KAISHA, Sakai (JP)

(72) Inventor: Wataru Nishii, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 205 days.

(21) Appl. No.: 18/200,434

(22) Filed: May 22, 2023

(65) Prior Publication Data

US 2023/0409712 A1    Dec. 21, 2023

(30) Foreign Application Priority Data

May 26, 2022  (JP) .................................. 2022-085878

(51) Int. Cl.
*G06F 21/56*    (2013.01)
*G06F 3/12*     (2006.01)

(52) U.S. Cl.
CPC .......... *G06F 21/564* (2013.01); *G06F 3/1205* (2013.01); *G06F 3/1274* (2013.01)

(58) Field of Classification Search
CPC ..... G06F 21/564; G06F 3/1205; G06F 3/1274
See application file for complete search history.

(56) References Cited

U.S. PATENT DOCUMENTS

| | | | | |
|---|---|---|---|---|
| 5,758,043 A | * | 5/1998 | Takizawa | ............... H04N 1/40 358/401 |
| 2009/0213403 A1 | * | 8/2009 | Sojian | ................... G06F 3/1245 358/1.13 |
| 2011/0032567 A1 | * | 2/2011 | Ishida | ................. H04N 1/00347 358/1.15 |
| 2020/0151333 A1 | * | 5/2020 | Tomiyasu | ............. G06F 3/1239 |
| 2023/0394148 A1 | * | 12/2023 | Seto | ...................... G06F 21/566 |

FOREIGN PATENT DOCUMENTS

JP    2020-203419 A    12/2020

* cited by examiner

*Primary Examiner* — Jeffrey C Pwu
*Assistant Examiner* — Edgar W Xie
(74) *Attorney, Agent, or Firm* — ScienBiziP, P.C.

(57) ABSTRACT

An image forming apparatus includes a data inputter that receives job data pertaining to a print job; a job controller that stores job data in the memory as partial data to sequentially print received portions of the job data when the virus check is disabled or unnecessary and that stores the job data as a single file when the virus check is enabled; a data analyzer that analyzes the job data to generate data for image formation; and a virus checker that performs virus check on the job data stored as the single file, wherein the job controller causes the printer to perform printing based on the job data when the virus checker determines that a computer virus is not embedded in the job data.

5 Claims, 5 Drawing Sheets

IMAGE FORMING APPARATUS AND IMAGE FORMING METHOD

BACKGROUND OF THE INVENTION

Field of the Invention

The disclosure relates to an image forming apparatus and an image forming method, and more particularly to an image forming apparatus and an image forming method having a virus check function.

Description of the Background Art

The image forming apparatus sequentially stores job data (data pertaining to print jobs to be executed) received from external information processing devices or other devices in a memory buffer, analyzes the data from the beginning, generates secondary data, for example, for rendering, and performs rendering using the secondary data. The rendered data (tertiary data) is then used for sequential image formation (printing). That is, before the received job data is saved as a single coherent file, printing is executed using the sequentially saved partial data (hereinafter referred to as "partial data" in this specification). In this way, printing is generally performed with a minimum delay from the time job data is sent from an information processing device to the time printing is started. Hereafter, such a mode of sequential printing from the received portion of the job data before receiving all of the job data is referred to as "sequential processing mode" in this specification.

Most virus check software can only check for viruses in data saved in a predetermined format as a file managed on the operating system (OS) of the information processing device. Data in formats other than files is not assumed to be subject to virus checking, and thus there is a limitation in that correct results cannot be obtained. This is because a computer virus is a type of program, and the program code to be executed by a computer (or processor) on an operating system is stored as a file.

A computer virus is a computer program designed to execute unauthorized processing. The general method used by virus check software to detect computer viruses is to match target files with a database in which program codes (signature codes) pertaining to specific processes contained in known viruses are registered. The database used for matching is also referred to as "virus pattern file" or "virus definition file". A virus pattern file is a database created by extracting all or part of the signature codes from known computer viruses and registering extracted codes. Creating and updating virus pattern files require expertise and significant effort. Therefore, virus check software is currently provided by a limited number of parties.

Job data includes codes that control the processes executed by a processor of the image forming apparatus with respect to printing, such as secondary data generation for rendering and rendering processes. Job data has aspects in common with a computer program in that it is data that defines the process to be executed by the processor. The job data may be stored as a file on an external device, and since it is a file, it may be infected with a computer virus.

That is, the possibility that a computer virus program code is embedded in some of the job data cannot be denied. When the job data is received and the processor executes a rendering process on the operating system, the computer virus program code embedded in the job data may be executed. When the virus program code is executed, there is a risk that the computer virus may infect other files, steal or destroy data, or execute unauthorized processes that are not originally intended.

In this regard, there is known an image forming apparatus provided with a virus check function from a security perspective and checks files received from outside for viruses. If the results of the virus check indicate that the system is infected with a virus, the job data stored in the storage device is discarded.

However, virus check takes a long time depending on file size and other conditions. On the other hand, if virus check of the data pertaining to the second printing cannot be completed and printing cannot be started within the wait time between the completion of the printing of a first page of job data and the start of the printing of a second page, a so-called jam occurs. Therefore, according to a conventional technology, it is determined whether or not the printing process of job data and the virus checking process can be executed simultaneously for each page. If it is determined that the virus checking process can be completed during the printing process, the printing process of the job data and the virus check process are executed simultaneously to reduce performance degradation of the printing process. On the other hand, if it is determined that simultaneously executing the virus check process and the printing process prevents the virus checking process from being completed within the wait time, the apparatus waits for the virus check to be completed before starting to print pages. In this way, the downtime of the printing process due to the virus checking process can be minimized.

From a security perspective, virus checking in the image forming apparatus should be performed immediately after job data received from an external device is saved as a file in the image forming apparatus. As a result, security is ensured by deleting the job data that is determined to have a computer virus embedded therein before a process using the job data is executed or prohibiting access to the job data.

However, as explained above, many virus check software has a limitation that, if virus check is to be performed using such virus check software, virus pattern matching must be performed on the file after the received job data is saved as a file.

Conventional technologies do not include a case in which virus check software with such a limitation is executed in an image forming apparatus.

The sequential processing mode is for printing sequentially from the part of the job data that has been received before all of the job data is received, thereby reducing the delay time to start printing. However, when a virus check is attempted, the virus check can only be performed after all job data has been received and saved to a file.

The disclosure is made in consideration of the above circumstances and provides a method to reduce unnecessary delays in the printing process as much as possible when virus check software that checks only files is used.

SUMMARY OF THE INVENTION

An aspect of the disclosure provides an image forming apparatus including: a virus check setter that accepts a setting on whether or not to perform virus check; a data inputter that receives job data pertaining to a print job; a memory that stores received job data; a job controller that stores job data in the memory as partial data to sequentially print received portions of the job data when the virus check is disabled or unnecessary and that stores the job data as a single file when the virus check is enabled; a data analyzer that analyzes the job data to generate data for image formation; a printer that performs printing using the data for image formation; and a virus checker that performs virus check on the job data stored as the single file, wherein the job controller causes the printer to perform printing based on the job data when the virus checker determines that a computer virus is not embedded in the job data.

From a different perspective, an aspect of the disclosure includes: accepting a setting on whether or not to perform virus check by a controller controlling the execution of a print job of the image forming apparatus; receiving job data pertaining to a print job from an external device; storing received job data in a memory as partial data to sequentially print received portions of the job data when the virus check is disabled or unnecessary and that stores the job data as a single file when the virus check is enabled; analyzing the job data to generate data for image formation; performing virus check on the job data stored as a single file; and performing printing based on the job data by using a printer when the job data is determined not to have a computer virus embedded therein.

In the image forming apparatus according to the disclosure, a job controller stores job data in a memory as partial data when the virus check is disabled or unnecessary and stores the job data as a file when the virus check is enabled; the virus checker performs virus check on the job data stored as a file; and a printer performs printing based on the job data when the job data is determined not to have a computer virus embedded therein. Therefore, when virus check software that only checks files is used, unnecessary delays in the printing process can be minimized.

The image forming method according to the disclosure also achieves similar advantageous effects.

DESCRIPTION OF THE PREFERRED EMBODIMENTS

The disclosure is described in detail below with reference to the accompanying drawings. The following description is illustrative in all respects and should not be construed as limiting the present disclosure.

First Embodiment

Figure 1:
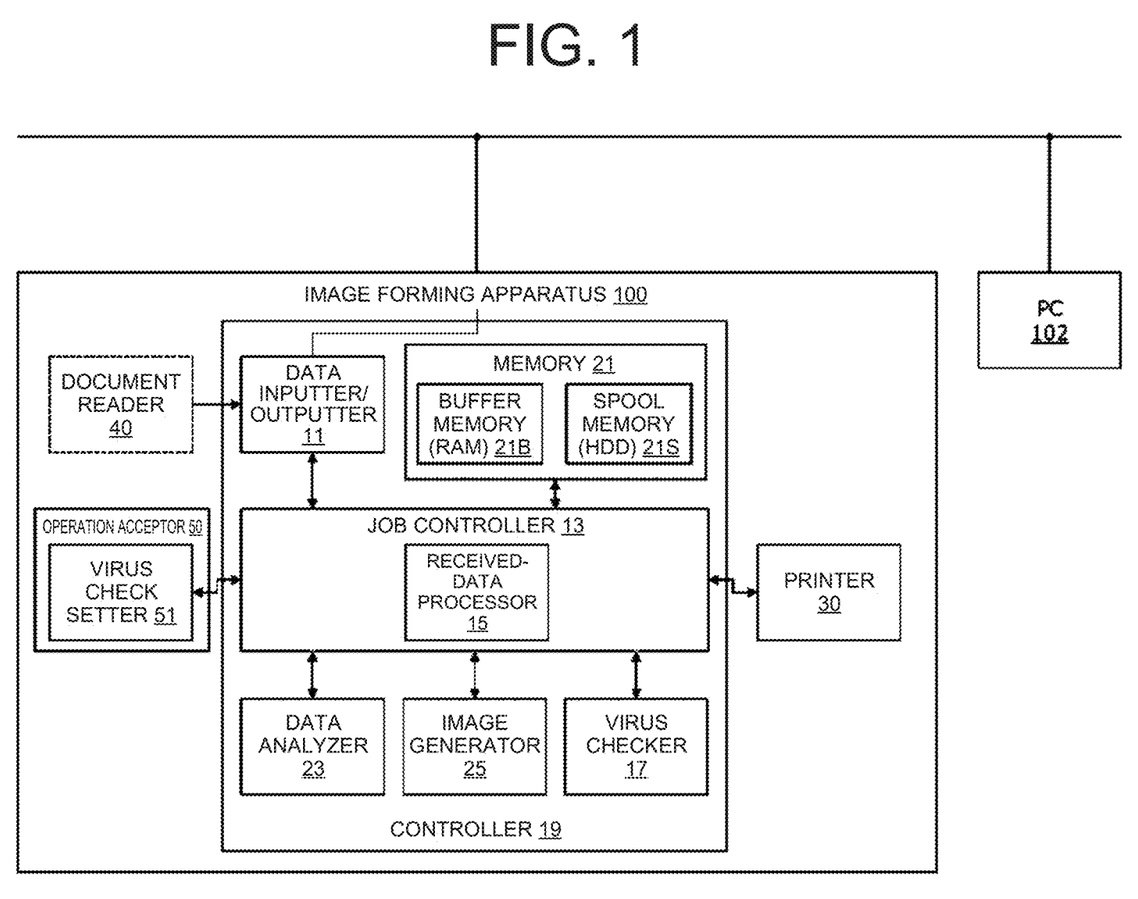
FIG. 1 is a block diagram illustrating a configuration example of an image forming apparatus according to the present embodiment.

FIG. 1 is a block diagram illustrating a configuration example of an image forming apparatus according to the present embodiment.

As illustrated in FIG. 1, an image forming apparatus 100 is connected to a personal computer (PC) 102, which is an external device, via communication. Job data can then be received from the external device.

The image forming apparatus 100 includes a controller 19, a printer 30, and an operation acceptor 50. The image forming apparatus 100 may also include a document reader 40.

The controller 19 consists mainly of a processor and memory as hardware resources and includes a data inputter/outputter 11, a job controller 13, a virus checker 17, a memory 21, a data analyzer 23, and an image generator 25.

The data inputter/outputter 11 includes a communication circuit that receives job data from an external PC 102. The data inputter/outputter 11 also allows a universal serial bus (USB) memory (not illustrated in FIG. 1) to be attached and includes an interface circuit to receive job data transferred from the attached USB memory. The data inputter/outputter 11 may also include an interface circuit that receives image data of a document read by the document reader 40. In addition, the image forming apparatus 100 stores internal data, such as counter data, data of setting values, and data of job execution history, in the memory 21, and includes an interface circuit to receive job data when such internal data is printed and output by the printer 30. Not limited to this, the data inputter/outputter 11 is an interface circuit that receives job data sent from external devices and printing data generated in the image forming apparatus 100, e.g., by any document reader 40.

The job controller 13 controls the image forming apparatus 100 to execute processing pertaining to printing of the received job data. The job controller 13 includes a received-data processor 15.

The virus checker 17 is a function implemented by a processor pertaining to the controller 19 executing a process of a virus check software provided as a program module.

The received-data processor 15 executes processing pertaining to received job data.

The memory 21 consists of multiple memory devices and includes a buffer memory 21B and a spool memory 21S.

The buffer memory 21B consists of a RAM capable of high-speed reading and writing and is used for storing received job data and printing in a sequential processing mode in which the stored job data is passed to the data analyzer 23 in order from the beginning.

The spool memory 21S is slower in reading and writing than the buffer memory 21B but has a large storage capacity and can store job data as a single file. The spool memory 21S reads and writes faster than the processing speed of printing performed by the printer 30. In the present embodiment, the spool memory 21S consists of a hard disk drive (HDD).

The spool memory 21S is a memory that temporarily stores the received job data as a file to absorb the difference in processing speed between the receiving process of job data sent from the PC 102 and printing by the printer 30. By storing the received job data as a file in the spool memory 21S, virus check is performed on the job data stored as a file in the spool memory 21S, and a print process can be executed for job data that is determined not to contain embedded computer virus codes. On the other hand, job data that is determined to have computer virus codes embedded therein can be deleted before data analysis is performed to ensure security.

The data analyzer 23 analyzes the received job data to generate secondary data for rendering. The job data analysis is implemented by a processor pertaining to the controller 19 executing a process of data analysis provided as a program module.

The image generator 25 performs rendering using the secondary data to generate bitmap data (tertiary data) for each color: yellow (Y), magenta (M), cyan (C), and black (K). The rendering is implemented by a processor pertaining to the controller 19 executing a process of rendering provided as a program module.

The printer 30 creates a visible image based on tertiary data and prints the visible image on a printing sheet. The printing method is not limited, and may be, for example, an electrophotographic method, an inkjet method, or a dye-sublimation ink-based methods.

The document reader 40 uses an image sensor to read the image of a document and generate data on the image corresponding to the document.

The operation acceptor 50 receives settings by a user. The operation acceptor 50 includes a virus check setter 51. The virus check setter 51 accepts settings by a user for whether or not to perform virus check on job data.

In the sequential processing mode, upon receiving job data from an external device, the received-data processor 15 passes the job data to the data analyzer 23 via the buffer memory 21B. When the data analyzer 23 receives new job data during an analysis process of certain job data, the following spool reception is performed. However, this is a case when the setting "spool reception of print data" is enabled among the various settings of the image forming apparatus 100. To prevent a timeout error, the received-data processor 15 causes the newly received job data to be spool-received in the background in the spool memory 21S.

However, when an immediate response is required from the host from which the job data is sent, spool reception is not performed to give priority to that communication. Examples of cases that require immediate response include printing when the network printing protocol RAW port setting is used and bidirectional communication with the host is enabled, and printing via a USB interface.

When the analysis process in progress of the earlier job data is completed during the spool reception, the received-data processor 15 starts analyzing the job data that has been spool-received and stored in the spool memory 21S. When the spool reception is not completed, the job data stored in the spool memory 21S is analyzed while the spool reception continues. Such processing is also included in the sequential processing mode.

Meanwhile, depending on the job data type and setting, the job data is saved as a file in the spool memory 21S before printing. The process of saving job data as a file before printing is referred to as "file saving mode". An example of job data operated in the file saving mode is portable document format (PDF) printing. When the virus check function enabled, printing is performed in the file saving mode, regardless of the job data type or setting.

When printing that does not require virus check, such as printing of data generated within the image forming apparatus, virus check is not performed on the job data.

Second Embodiment

When job data is received via a network, a single print job is usually sent in a single session so that file saving is completed at the end of the session. However, in some cases, the session may not end even after a single print job has been sent. For example, in the case of printing via the USB interface, input/output timeout forces the session to end, and file saving is completed.

When multiple jobs are received during the same session (within a timeout period), it takes time to start printing if all jobs are processed as a single file. In addition, the file size may become so large that it reaches the upper limit of the maximum file size that can be communicated, and further data reception or file saving may become impossible.

In printing in which job data is received from a host of a mission-critical server, when a RAW port setting is used and bidirectional communication is enabled, the host side may perform the following communication control. In the middle of sending job data, the host sends a specific bidirectional communication command to hold the session and waits for a Ready response from the image forming apparatus 100. If the image forming apparatus 100 returns a Ready response, the host sends continued data, but if the image forming apparatus 100 does not return a Ready response, the host does not send continued data. When operated in the file saving mode, the image forming apparatus 100 times out without returning a Ready response and completes file save unilaterally. As a result, no further data is sent because no response command is returned to the host, and thus printing cannot be performed.

In the present embodiment, the received-data processor 15 monitors whether the received job data contains a bidirectional communication command or a universal exit language (UEL) command that instructs printing on a new sheet (and thus the end of printing on the current sheet). If there is data indicating a break in the job, such as a bidirectional communication command or a UEL command, the data up to that point is separated and saved as a file. Then, a Ready response is returned in response to the bidirectional communication command, and the files are processed sequentially, starting in the order of being saved. This enables response processing of a bidirectional communication command.

Third Embodiment

Depending on the print port settings and printing method, job data with banners and job control commands may be received. One example is when a line printer daemon protocol (LPD), which is a network printing protocol, is set to perform banner printing. Another example is a specific type of direct printing in which a file is sent to the image forming apparatus 100 without a printer driver, and printing is performed in the image forming apparatus 100 in accordance with the file format.

If extra data is added at the beginning or end of the file that is the target of the virus check, the virus check does not function properly and correct results cannot be obtained.

In the present embodiment, when extra data is added at the beginning or end of a file in a job data format assumed by the virus checker 17, the received-data processor 15 ignores the added data so that virus checking can be performed. The introductory data added before the job data is referred to as "header", and the data added after the job data is referred to as "Tooter". An example of a header is an LPD print banner. Another example is a printer job language (PJL) command that instructs the image forming apparatus 100 to establish various settings for a print job to be performed. Although the UEL command was described in the second embodiment, the UEL command is actually one of many PJL commands. An example of a footer is the UEL command. When at least one of a header and a footer is added, the received-data processor 15 detects its position and passes the position information (start offset and end offset of virus check) to the virus checker 17.

Alternatively, when the virus checker 17 determines that the virus check cannot be performed by ignoring the start offset and end offset, a separate file for virus check is created by removing the header and footer from the job data stored in the spool memory 21S. The created file is then passed to the virus checker 17 for virus check. When a computer virus is detected, the original job data is deleted along with the file for virus check. The print job pertaining to that job data is then canceled.

Patterns of Received Job Data

Figure 2:
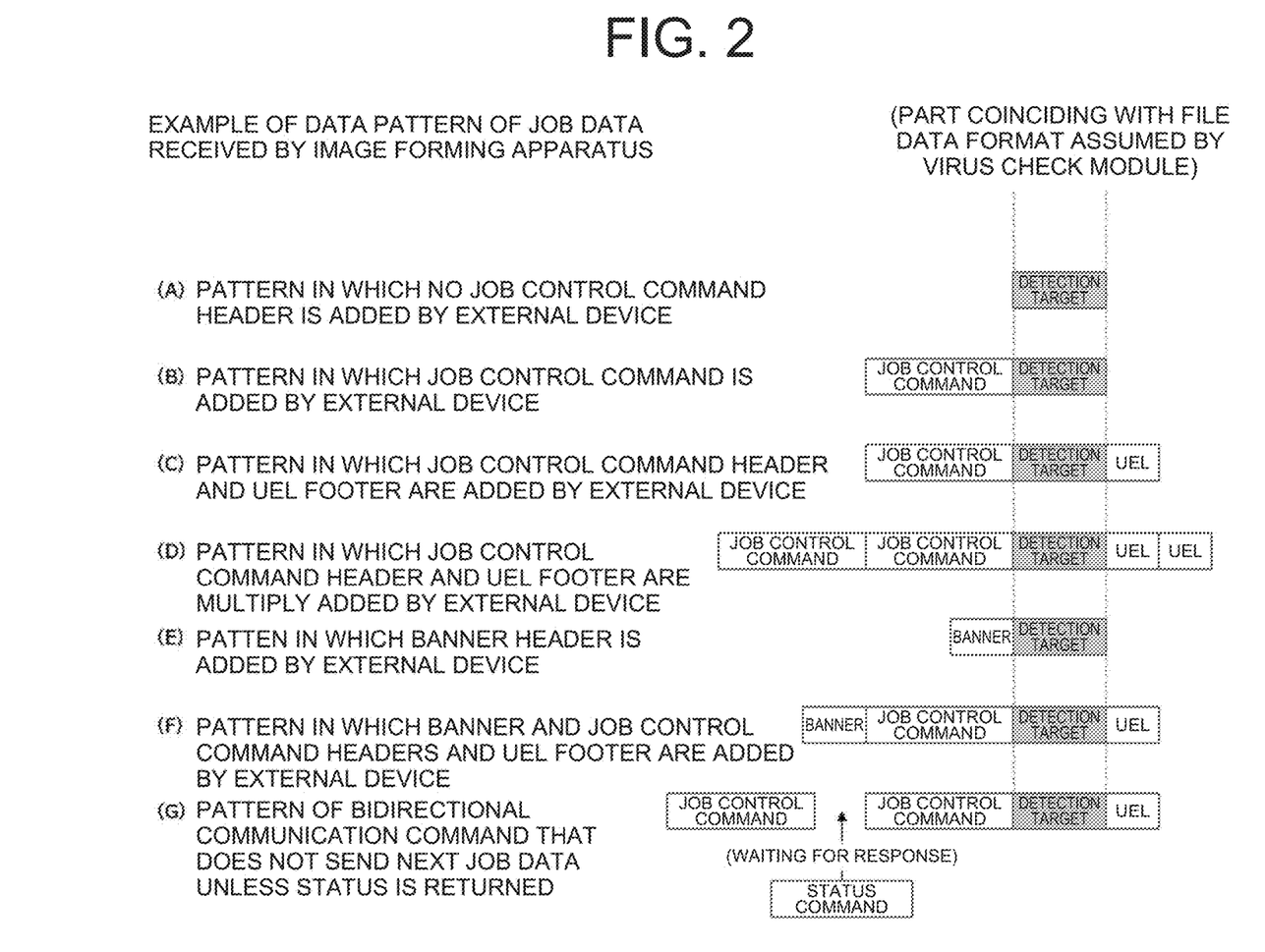
FIG. 2 illustrates an example of a data pattern of job data received by the image forming apparatus of an embodiment.

FIG. 2 illustrates an example of a data pattern of job data received by the image forming apparatus. The seven patterns (A) to (G) are listed in FIG. 2. The part of the file that matches the data format of the file assumed by the virus checker 17 is the part indicated as "detection target". The left side of "detection target" indicates an example of a header added before the job data, and the right side indicates an example of a footer added after the job data.

(A) indicates a pattern in which job data is sent from an external device without a footer and a header.
(B) through (F) illustrates patterns of job data with a header and a footer described in the third embodiment.
(B) illustrates a pattern in which job data is sent from an external device with a job control command added as a header. A specific example of a job control command is the PJL command. The start and end of the PJL command are identified by a specific sequence of character codes, which distinguishes the header from the job data or detection target. The same applies to the footer.
(C) illustrates a pattern in which job data is sent from an external device with a job control command and a UEL command are added as a header and footer, respectively.
(D) illustrates a pattern in which job data is sent from an external device with headers and footers multiply added.
(E) illustrates a pattern in which job data is sent from an external device with a banner added as a header.
(F) illustrates a pattern in which job data is sent from an external device with a banner and a job control command added as a header.
(G) illustrates an example of the bidirectional communication command described in the second embodiment. The external device or host waits for a response (status command) to the job control command from the image forming apparatus 100 and then sends the continued data. If the image forming apparatus 100 does not return a status command, the continued data is not sent.

Flowchart.

The content described the first to third embodiments is explained using a flowchart from the perspective of the flow of processing performed by the job controller.

Figure 3:
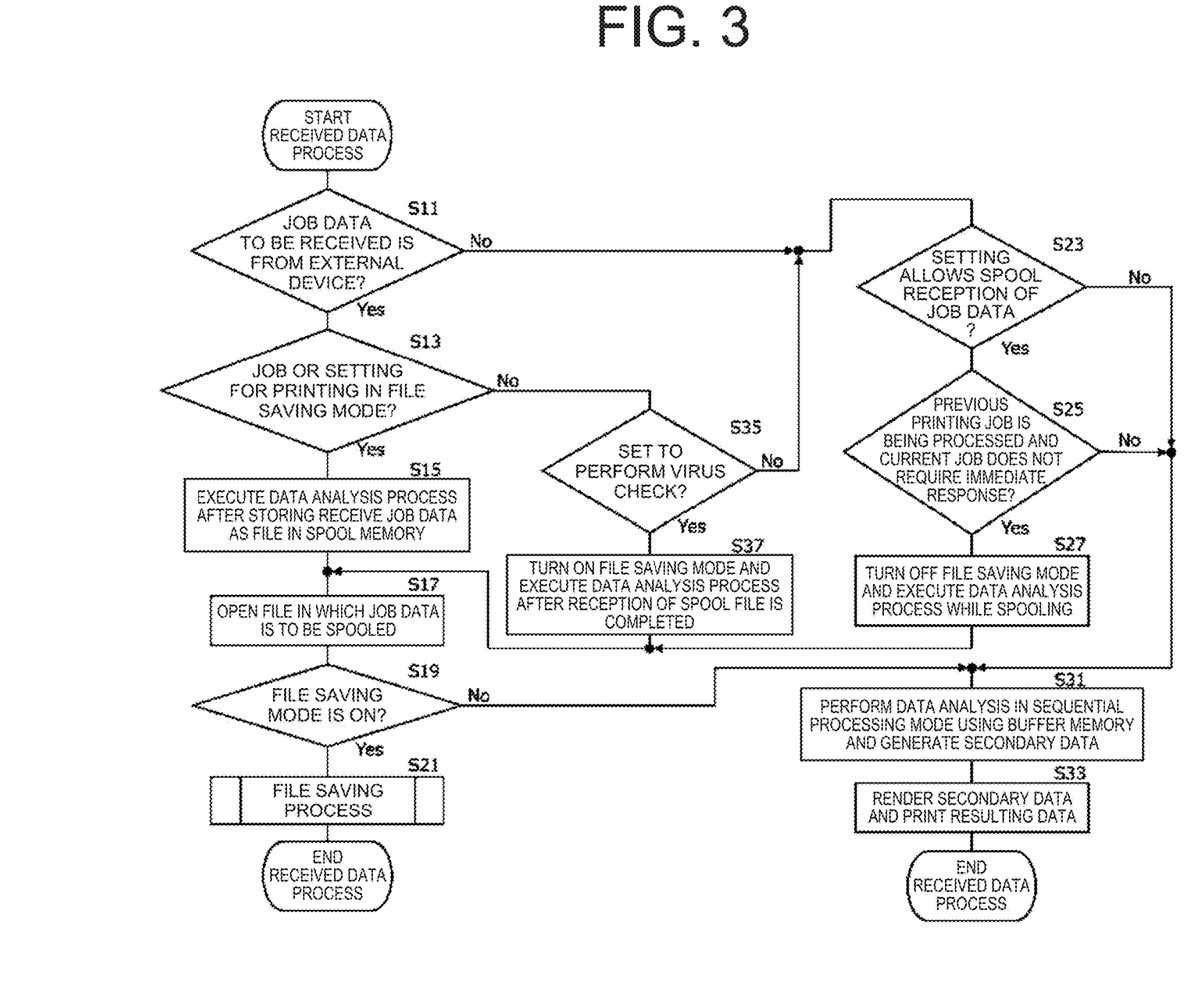
FIG. 3 is a flowchart illustrating an example of a process pertaining to print data reception executed by a job controller of the image forming apparatus illustrated in FIG. 1.
Figure 4:
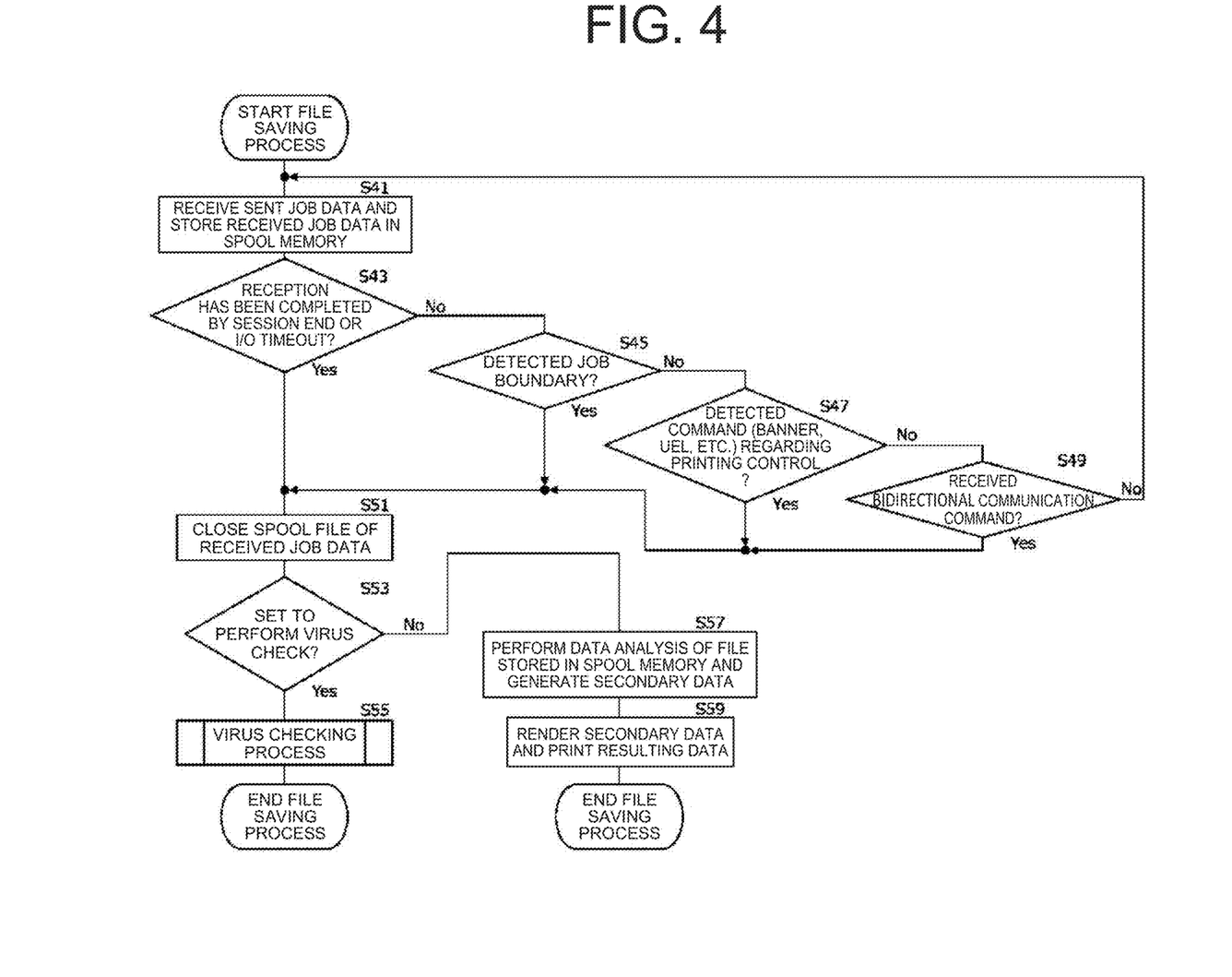
FIG. 4 is a flowchart illustrating details of a file saving process illustrated in FIG. 3.
Figure 5:
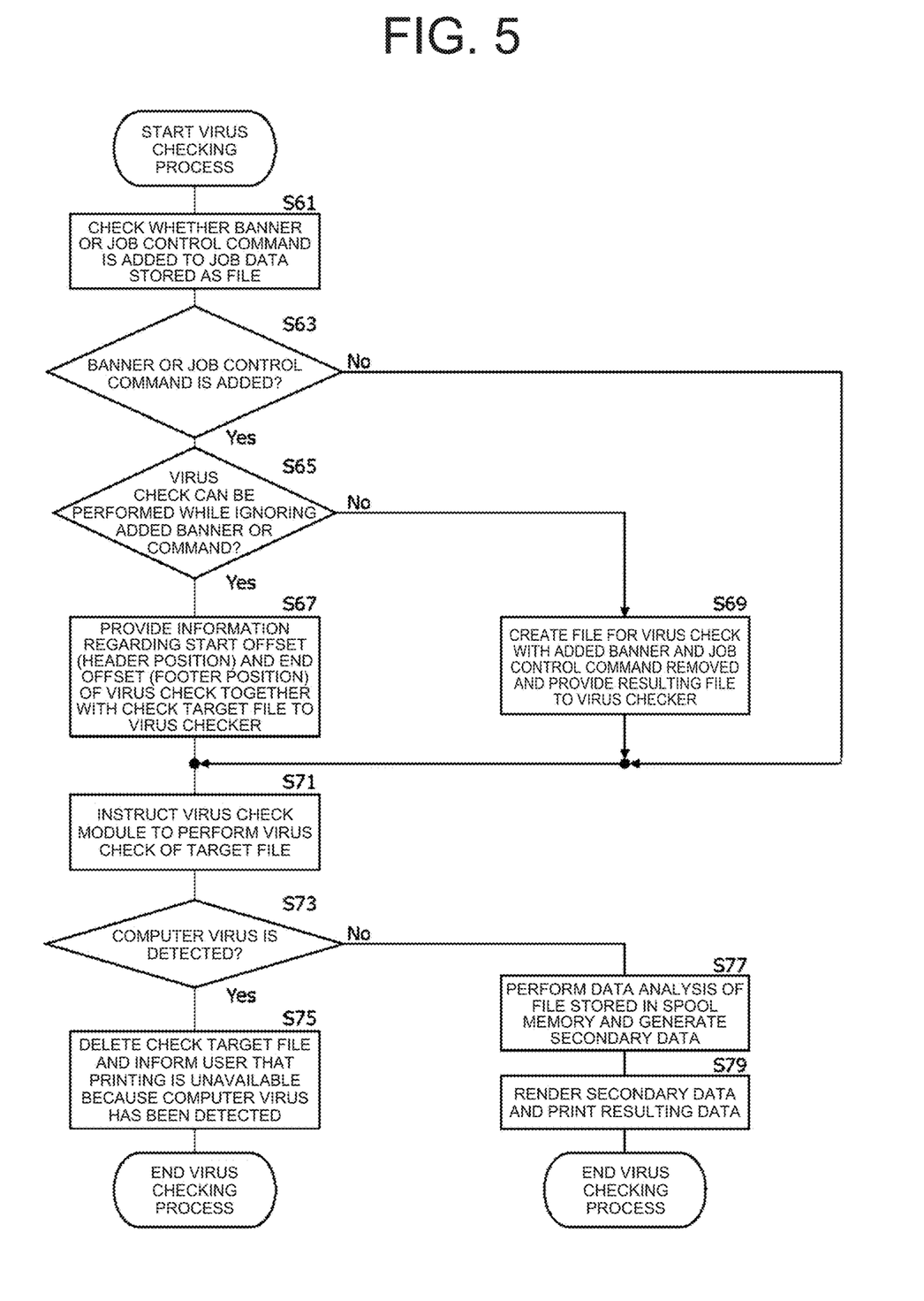
FIG. 5 is a flowchart illustrating details of a virus checking process illustrated in FIG. 3.

FIGS. 3 to 5 are flowcharts illustrating examples of processes executed by the job controller of the image forming apparatus illustrated in FIG. 1. FIG. 3 illustrates an example of a process pertaining to reception of print data. FIG. 4 illustrates details of the file saving process illustrated in FIG. 3. FIG. 5 illustrates details of the virus checking process illustrated in FIG. 3.

As illustrated in FIG. 3, when the received-data processor 15 receives job data, it determines whether or not the job data was sent from an external device (step S11). If the job data is received from an external device, the received-data processor 15 determines that a computer virus code may be embedded and executes the following process.

First, the received-data processor 15 determines whether or not the job data should be printed in the file saving mode (step S13). For example, for PDF printing (Yes in step S13), printing should be performed in the file saving mode.

If printing should be performed in the file saving mode, the received job data is saved as a file before executing the process pertaining to printing (step S15).

Then, the received-data processor 15 opens the file to store the received job data as a file in the spool memory (step S17). The received-data processor 15 then determines whether or not printing is performed in the file saving mode (step S19). If the process pertaining to printing is executed in the file saving mode (Yes in step S19), the file saving process is executed (step S21), and the process ends.

Details of the file saving process are illustrated in FIG. 4.

If step S19 determines that the file saving mode is turned off (No in step S19), the job controller 13 perform printing pertaining to the received job data in a sequential processing mode using the buffer memory 16B (step S31).

Here, the job data received in the sequential processing mode using the buffer memory 16B is partial data, and its data format is a unique data format suitable for data analysis in order from the top while the data is sequentially stored in the buffer memory. The format of the file does not allow the file to be managed as a single independent file in the OS file system. That is, the data is not in a format that can be checked for viruses with virus check software.

The OS is installed in the controller 19, and the various programs that operate on the controller 19 are based on the OS. The virus check software is also based on the OS. The virus check software is designed to check data in file formats that can be managed by the OS for viruses, and cannot process partial data that is of a unique data format as a check target. In printing in the sequential processing mode, the job controller 13 generates secondary data by performing data analysis processing with the data analyzer 23 sequentially from the beginning of the job data stored in the buffer memory (step S31). The generated secondary data is then rendered and printed (step S33).

On the other hand, if step S13 determines that the job is not one that should be printed in the file saving mode (No in step S13), the received-data processor 15 makes the following determination. The received-data processor 15 determines whether or not the setting accepted by the virus check setter 51 is the setting for performing virus check on the job data (step S35). If the setting is for performing virus check (Yes in step S35), the printing is set to be performed in the file saving mode (step S37). The process then proceeds to step S17 described above to open the spool file.

Meanwhile, if step S35 determines that no setting is established to perform virus check, the received-data processor 15 causes the process to proceeds to step S23 explained below.

In addition, if step S11 determines that the job data to be received is not received from an external device but is generated within the image forming apparatus 100 the received-data processor 15 causes the process to proceeds to step S23.

In step S23, the received-data processor 15 checks whether or not a setting for performing spool reception (step S23). If a setting is established to perform spool reception, the received-data processor 15 determines whether or not the print job pertaining to the previously received job data is still being processed and whether or not the job data to be received requires an immediate response (step S25). If the job data to be received is being processed for an earlier print job and does not require an immediate response (Yes in step S25), the received-data processor 15 turns off the file saving mode and controls the spool memory 21S to store the received data (step S27). The process then proceeds to step S17 described above to open the spool file.

If spool reception is set not to be performed in step S23 (No in step S23), the received-data processor 15 causes the process to proceed to step S31 to print in the sequential processing mode.

If an earlier print job is not being processed in step S25 or if job data requiring an immediate response is to be received (No in step S25), the received-data processor 15 causes the process to proceed to step S31 to print in the sequential processing mode.

The details of the file saving process in step S21 of FIG. 3 are explained below. Upon receiving the sent job data, the received-data processor 15 sequentially stores the received portion of the job data in the spool memory 21S (step S41 illustrated in FIG. 4). The received-data processor 15 makes the following determination.

First, the received-data processor 15 determines whether or not the receipt of job data has ended due to the session ending or timeout (step S43). If the reception of job data is completed (Yes in step S43), the process proceeds to step S51 described below.

If no session end or timeout has occurred (No in step S43), the received-data processor 15 determines whether or not a break in the print job within the same session has been detected (step S45). If a break in the print job is detected (Yes in step S45), the process proceeds to step S51 described below.

If a break in the print job is not detected (No in step S45), the received-data processor 15 determines whether or not a command, such as a banner or UEL, that triggers file saving has been detected (step S47). If a command or the like that triggers file saving is detected (Yes in step S47), the process proceeds to step S51 described below.

If no command or the like that triggers file saving is detected (No in step S47), the received-data processor 15 determines whether or not a bidirectional communication command has been received (step S49). If a bidirectional communication command has not been received (No in step S49), the process returns to step S41 to continue receiving the job data.

Meanwhile, if a bidirectional communication command is received (Yes in step S49), the process proceeds to step S51.

In step S51, the job controller 13 determines that the received job data has been stored in the spool memory 21S and closes the file (step S51). This is a process paired with the process of opening a file in step S17 of FIG. 3.

The process of closing a file in step S51 causes the file to be saved as a single file in a format that can be managed as an independent file in the OS file system. That is, the file is saved in a file format that can be checked by virus check software.

The job controller 13 then determines whether or not a setting is established to check the received job data for viruses (step S53). If the setting for performing virus check is established (Yes in step S53), the virus checking process is executed (step S55), and the process ends. Details of the virus checking process are explained below.

Meanwhile, if a setting is not established to perform virus check (No in step S53), the job controller 13 performs data analysis on the job data stored as a file in the spool memory 21S to generate secondary data (step S57). The generated secondary data is then rendered and printed (step S59), and the process ends.

The details of the virus checking process in step S55 of FIG. 4 are described below. The job controller 13 checks whether or not a banner or a job control command is added to the job data stored in the spool memory 21S as a file (step S61).

If a banner or a job control command is added (Yes in step S63), the job controller 13 determines whether or not the added banner or job control command can be ignored to perform virus check (step S65).

If the banner or job control command can be ignored to perform virus check, the job controller 13 provides the following information to the virus checker 17 in addition to the files to be checked for viruses. This information indicates the offset at which the virus check starts, that is, the position of the header, and the offset at which the virus check ends, that is, the position of the footer (step S67). The process then proceeds to step S71 described below.

Meanwhile, if step S65 determines that the added banner or job control command cannot be ignored for virus check (No in step S65), the job controller 13 generates a file with the added banner or job control command deleted. The job controller 13 then provides the generated file for virus check to the virus checker 17 (step S69). The job controller 13 then sends an instruction to the virus checker 17 to perform virus check of the target file (step S71).

When the virus checker 17 performs virus check in response to the instruction, the job controller 13 refers to the result.

If the result indicates that a computer virus code is embedded in the file (Yes in step S73), the job controller 13 deletes the target job data file. If a file is generated for virus check, this file is deleted as well. The user is then notified that a computer virus has been detected and printing cannot be performed for the job data (step S75). The process then ends.

If step S73 determines that no computer virus code is embedded in the file (No in step S73), the job controller 13 performs data analysis on the job data stored as a file in the spool memory 21S to generate secondary data (step S77). The generated secondary data is then rendered and printed (step S79), and the process ends.

The above is the process flow executed by the job controller 13 in the present embodiment.

As described above, (i) an image forming apparatus according the disclosure includes: a virus check setter that accepts a setting on whether or not to perform virus check; a data inputter/outputter that receives job data pertaining to a print job; a memory that stores received job data; a job controller that stores job data in the memory as partial data to sequentially print received portions of the job data when the virus check is disabled or unnecessary and that stores the job data as a single file when the virus check is enabled; a data analyzer that analyzes the job data to generate data for image formation; a printer that performs printing using the data for image formation; and a virus checker that performs virus check on the job data stored as the single file, wherein the job controller causes the printer to perform printing based on the job data when the virus checker determines that a computer virus is not embedded in the job data.

In the disclosure, virus check determines whether or not a target file has an embedded computer virus program code that executes an unauthorized process. An example of a specific check method is a pattern matching of matching target files with a database in which program codes (signature codes) pertaining to specific processes contained in known viruses are registered.

An external device provides job data stored as a file. Specific aspects include information processing devices such as PCs, smartphones, cloud servers, and print servers. Another specific aspect is a USB memory, network access drive (NAS), or other storage device that can store and transfer files. The PC of the present embodiment is an example of an external device.

Furthermore, a print job is a set of information that directs a printing process to be executed by the image forming apparatus.

Job data includes information indicating the settings pertaining to the print job and the content of the print job (e.g., page description language). Job data is a file, but job data received from an external device may be preceded by a header, such as a command or banner pertaining to a print job, or followed by a footer, such as a UEL command instructing printing on a new sheet (and thus the end of printing on the current sheet).

The data inputter/outputter receives job data when the job data is sent from an external device. Specific aspects include, for example, a communication circuit that receives job data from an external device via telecommunication and an input/output circuit that receives job data from a directly connected USB memory or other storage devices. Image data read by the image forming apparatus may be received.

The memory stores job data. However, various types of data, e.g., program data, may be stored in addition to job data. Specific aspects include, for example, a random access memory (RAM) as a buffer memory to temporarily store job data, and HDD or solid-state disk (SSD) as a spool memory. A buffer memory is applied to store job data when partial data is stored and sequentially printed from the received portions, and a spool memory is applied to store job data as a single file.

Furthermore, the job controller controls the execution of print jobs. Specific aspects include a configuration in which a processor executes a control program stored in a memory to provide the function of a job controller.

The data analyzer analyzes received job data to generate data for image formation. Specific aspects of data for image formation include, for example, intermediate data generated from job data and used for rendering.

The printer forms images by using rendered data. Specific aspects include, for example, those that form images using electrophotographic photoreceptors, those that form images using inkjet nozzles, and those that form images by thermal transfer using dye-sublimation inks.

The virus checker causes the processor of the image forming apparatus to perform a virus checking process. Specific aspects include, for example, one that receives a virus check program from a virus check software provider, embed the virus check program as a program module, and have the processor execute the virus check program. The virus checker in the aforementioned embodiment corresponds to this configuration.

A case in which virus check is not required is when there is no possibility of a computer virus code being embedded. Examples include data that is generated within the image forming apparatus and not stored as a file. Even for job data received from external devices, virus check may be unnecessary for job data that is determined not to be stored as files.

Furthermore, a description will be made on preferred aspects of the present disclosure.

(ii) The job controller may delete job data without generating the data for image formation when the job data is determined to have an embedded computer virus code as a result of virus check.

According to this aspect, if it is determined that a computer virus code is embedded in the received job data, the data analyzer 23 deletes the job data before executing a process based on that job data, so that the processor does not execute the embedded computer virus code. This can ensure security.

(iii) The data for image formation may be secondary data generated for a rendering process.

According to this aspect, the processor does not execute a computer virus code embedded in the job data because the job data is deleted before intermediate secondary data for the rendering process is generated from the received job data.

(iv) The data inputter/outputter may receive job data when the job data is sent from an external device via communication, and, when the data inputter/outputter receives a plurality of print jobs within one session; the data inputter/outputter may store each of the received print jobs as a file at each piece of data indicating a break in the print jobs; the virus checker may perform virus check on each file; and the job controller may print job data determined, as a result of virus check, to have no computer virus code embedded therein.

According to this aspect, when data indicating a break in print jobs is found in a single session, which is a series of communications from the start to the end of access to data, includes multiple print jobs, the job data received up to that point is stored as a single file and virus check is performed. Thus, there is no need to delay the start of virus check until the session is finished, and unnecessary delays in the printing process can be suppressed.

(v) When a command pertaining to control of a print job is added to at least at a beginning or end of received job data, the data inputter/outputter passes information for performing virus check by ignoring the added command to the virus checker or deletes the added command and passes the job data to the virus checker.

According to this aspect, even if a control command is added to at least one piece of the received job data, the virus check can be performed as conforming to the file format assumed by the virus checker.

(vi) An aspect of the disclosure includes: accepting a setting on whether or not to perform virus check by a controller controlling the execution of a print job of the image forming apparatus; receiving job data pertaining to a print job from an external device; storing received job data in a memory as partial data to sequentially print received portions of the job data when the virus check is disabled or unnecessary and that stores the job data as a single file when the virus check is enabled; analyzing the job data to generate data for image formation; performing virus check on the job data stored as a single file; and performing printing by using a printer when the job data is determined not to have a computer virus embedded therein, the printing being based on the job data.

Aspects of the disclosure include combinations of any of the above-described aspects.

Various modifications can be made to the disclosure in addition to the above-described embodiments. Those modifications should not be construed as falling outside the scope of the disclosure. The disclosure is embodied by the claims and their equivalents, and should embrace all modifications within the scope of the claims.

What is claimed is:

1. An image forming apparatus comprising at least one processor configured to:
   accept a setting on whether or not to perform a virus check;
   receive job data pertaining to a print job;

store the job data in a memory of the image forming apparatus as partial data to sequentially print received portions of the job data when the virus check is disabled or unnecessary;

store the job data in the memory of the image forming apparatus as a single file when the virus check is enabled;

when a command pertaining to control of the print job is added to at least at a beginning or an end of the received job data, transmit the job data and information for performing the virus check by ignoring the added command or delete the added command and transmit the job data for the virus check;

perform the virus check on the job data stored as the single file; and when determining that a computer virus is not embedded in the job data during the virus check, analyze the job data to generate data for image formation and perform printing based on the data for image formation.

2. The image forming apparatus according to claim 1, wherein the at least one processor is further configured to delete the job data without generating the data for image formation when the job data is determined to have an embedded computer virus code as a result of the virus check.

3. The image forming apparatus according to claim 1, wherein the data for image formation comprises secondary data generated for a rendering process.

4. The image forming apparatus according to claim 1, wherein when receiving a plurality of print jobs within one session, the at least one processor is further configured to store each of the plurality of print jobs as a file at each piece of data indicating a break in the plurality of print jobs.

5. An image forming method performed by a controller that controls an execution of a print job of an image forming apparatus, the method comprising:

accepting a setting established by a user on whether or not to perform a virus check;

receiving job data pertaining to a print job from an external device;

storing the received job data in a memory of the image forming apparatus as partial data to sequentially print received portions of the job data when the virus check is disabled or unnecessary;

storing the job data in the memory of the image forming apparatus as a single file when the virus check is enabled;

when a command pertaining to control of the print job is added to at least at a beginning or an end of the received job data, transmitting the job data and information for performing the virus check by ignoring the added command or deleting the added command and transmitting the job data for the virus check;

performing the virus check on the job data stored as the single file; and when the job data is determined not to have a computer virus embedded therein, analyzing the job data to generate data for image formation and printing, based on the data for image formation, using a printer.

* * * * *